Patented Jan. 20, 1931

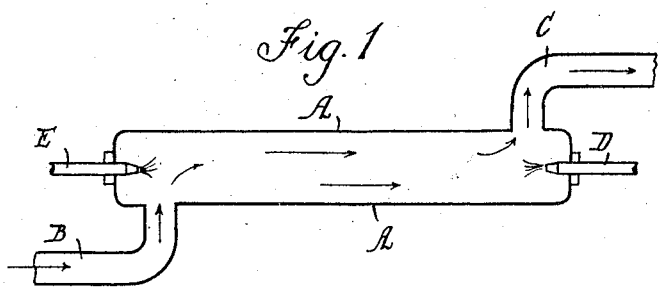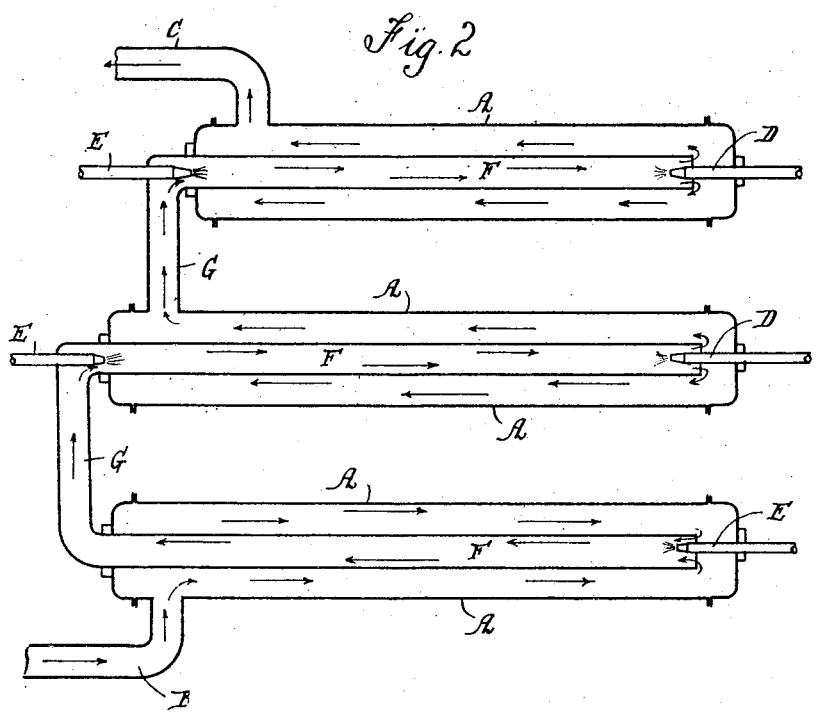

1,789,738

UNITED STATES PATENT OFFICE

GEORGE WILLIAM GANE, OF NORMANBY, NEW ZEALAND

APPARATUS FOR MAKING PRECIPITABLE THE SOLIDS HELD IN SOLUTION IN LIQUIDS

Application filed June 14, 1928, Serial No. 285,464, and in New Zealand July 19, 1927.

This invention has reference to a special form of apparatus designed for the heating of liquids containing solids in solution therein, for the purpose of rendering such solids precipitable and capable of separation from the liquid.

The invention has particular application to a process for the treatment of milk, skim milk, whey, or butter milk, by which the solid constituents thereof are, by the action of heat, rendered recoverable from the liquid in a precipitating or separating operation of any approved nature.

The invention consists in a special construction of apparatus designed for the progressive heating of the said liquid by the employment of steam as the heating agent, and while the liquid is being sent through the apparatus under pressure.

The invention consists more particularly in a construction of apparatus designed to provide for the continuous flow of the liquid under pressure through a vessel; and with which vessel a steam nozzle, or nozzles, is, or are, combined and so disposed as to deliver a jet or jets of steam into the liquid either in an opposing direction to the flow of the liquid, or in both an opposing and an assisting direction to the flow.

The apparatus may be varied in its form to suit special circumstances and the degrees of heating required, but in all cases it will provide for the continuous flow of the liquid under pressure and for its progressive heating by the admission of the steam to mingle with the liquid.

The general principles governing the form of apparatus designed are illustrated in the accompanying diagrammatic drawings, in which:—

Figure 1 is a view of the apparatus in its simplest form.

Figure 2 is a diagram illustrating an apparatus in which the liquid is caused to travel through a zig-zag course in a number of associated units.

The construction shown in Figure 1, which may be termed a single unit apparatus, provides a long cylindrical vessel A into one end of which an inlet pipe B leads and from the other end of which an outlet C leads. The inlet B is connected with the source of liquid supply so positioned and controlled as to provide for the liquid being sent through the vessel under any desired pressure. The outlet C is controlled by a valve so that the rate of the liquid's passage may be regulated.

A steam nozzle D is arranged to enter the vessel, at its outlet end and to project into it for a distance in the axial line thereof so that a jet of steam is delivered into the liquid in a direction opposing its flow, thereby checking the flow and heating the liquid more or less according to the pressure of the steam.

A similar steam nozzle E may be arranged to enter the inlet end of the vessel and to extend axially for a distance therein. This nozzle is used to introduce steam in the direction of flow and thereby to aid the flow, while heating the liquid.

In the form shown in Figure 2 the apparatus comprises a series of heating units each of which is formed by a central tube F and an enveloping tube A arranged to leave an annular space between them and so disposed that a continuous passage is formed by the said central tube and annular space. These units are so connected together that provision is made for the continuous travel through the whole series of units of a supply of liquid, and during such travel the said liquid is caused to pass through both passages of each unit as shown by the arrows.

In the apparatus shown, three units are provided and the liquid supply inlet B is led into the outer space of the first unit and passes along it and then enters the reverse end of the central tube F and travels along it back to the first end. That end of the tube is connected by the connection G to the central tube F of the second unit, and in such unit the liquid passes along the said tube and at the other end passes into the outer space, to then flow back to the first end. The latter end of the outer chamber is connected by another connection G to one end of the inner tube F of the next unit, and the opposite end of such inner tube opens to the annular space, while the first end of the outer chamber has the discharge pipe C carried away from it, so that the liquid passes one way along within the central tube and then back through the outer chamber to the discharge.

The liquid is led into the inlet B from any suitable pressure supply and flows from the outlet C through a valve controlling it and which allows for the period of flow being effectually governed to obtain any required temperature.

The steam inlet nozzles D and E are led into the ends of the inner tubes F of the several units so that they act to heat the liquid. These steam inlets, in some cases, as the inlets E, are arranged to admit the steam in the line of the flow, in order thus to assist the flow, while also heating the liquid. In other cases, as the inlets D, they are arranged to admit the steam in opposition to the flow in order thus to retard it and provide for a greater heating of the liquid. Each steam inlet is controlled by a valve, to govern the action of the steam upon the liquid.

The number of units thus combined may be varied, in some cases two being used and in others a greater number than the three shown in the drawings.

I claim:—

1. Apparatus for heating liquids containing solids held in solution therein, for the purpose of rendering such solids precipitable and capable of separation from the liquid, comprising an elongated, horizontally-arranged vessel; means at one end of the vessel for supplying liquid under pressure and containing the solids to be precipitated to flow therethrough; and a nozzle for injecting a jet of steam into said liquid in opposition to its direction of flow so as to heat the liquid progressively during its flow and, at the same time, check the flow.

2. Apparatus for heating liquids containing solids held in solution therein, for the purpose of rendering such solids precipitable and capable of separation from the liquid, comprising an elongated, horizontally-arranged vessel; means at one end of the vessel for supplying liquid under pressure and containing the solids to be precipitated to flow therethrough; and nozzles for injecting jets of steam into said liquid both in the direction of its flow and in a direction opposed thereto, so as to assist and to retard the flow, respectively, while at the same time heating the liquid progressively during the flow.

3. Apparatus for heating liquids containing solids held in solution therein, for the purpose of rendering such solids precipitable and capable of separation from the liquid, comprising a tubular system of horizontal pipes arranged in zig-zag and through which the liquid containing the solids to be precipitated is caused to flow; means for supplying liquid under pressure to said system; and nozzles for injecting jets of steam into said liquid at different stages in its flow and in a direction in opposition to the flow so as to heat the liquid progressively during its flow and, at the same time, check the flow.

4. Apparatus for heating liquids containing solids held in solution therein, for the purpose of rendering such solids precipitable and capable of separation from the liquid, comprising a tubular system of pipes arranged in zig-zag and through which the liquid is caused to flow; means for supplying liquid under pressure to said system; nozzles for injecting jets of steam into said liquid at different stages in its flow and in a direction in opposition to the flow; and other nozzles for injecting jets of steam into the liquid in the direction of its flow and at different stages from those first mentioned, the various nozzles acting to heat the liquid progressively during the flow.

5. In a method of treating liquids containing solids held in suspension therein, for the purpose of rendering such solids precipitable and capable of separation from the liquid, the step of passing the liquid under pressure through a closed vessel while injecting steam into said liquid both in the direction of its flow and in a direction opposed thereto, so as to assist and to retard the flow, respectively, while at the same time heating the liquid progressively during the flow.

6. A method of treating liquids containing solids held in suspension therein to be precipitated, comprising the step of passing the liquid under pressure and containing the solids through a closed vessel in a horizontal stream, while subjecting said stream to the progressive heating action of a hot fluid moving through the liquid in a direction opposed to the liquid flow so as to render the solids precipitable and separable from the liquid during the flow and at the same time check the flow.

In testimony whereof, I affix my signature.

GEORGE WILLIAM GANE.